Figures 1, 2:
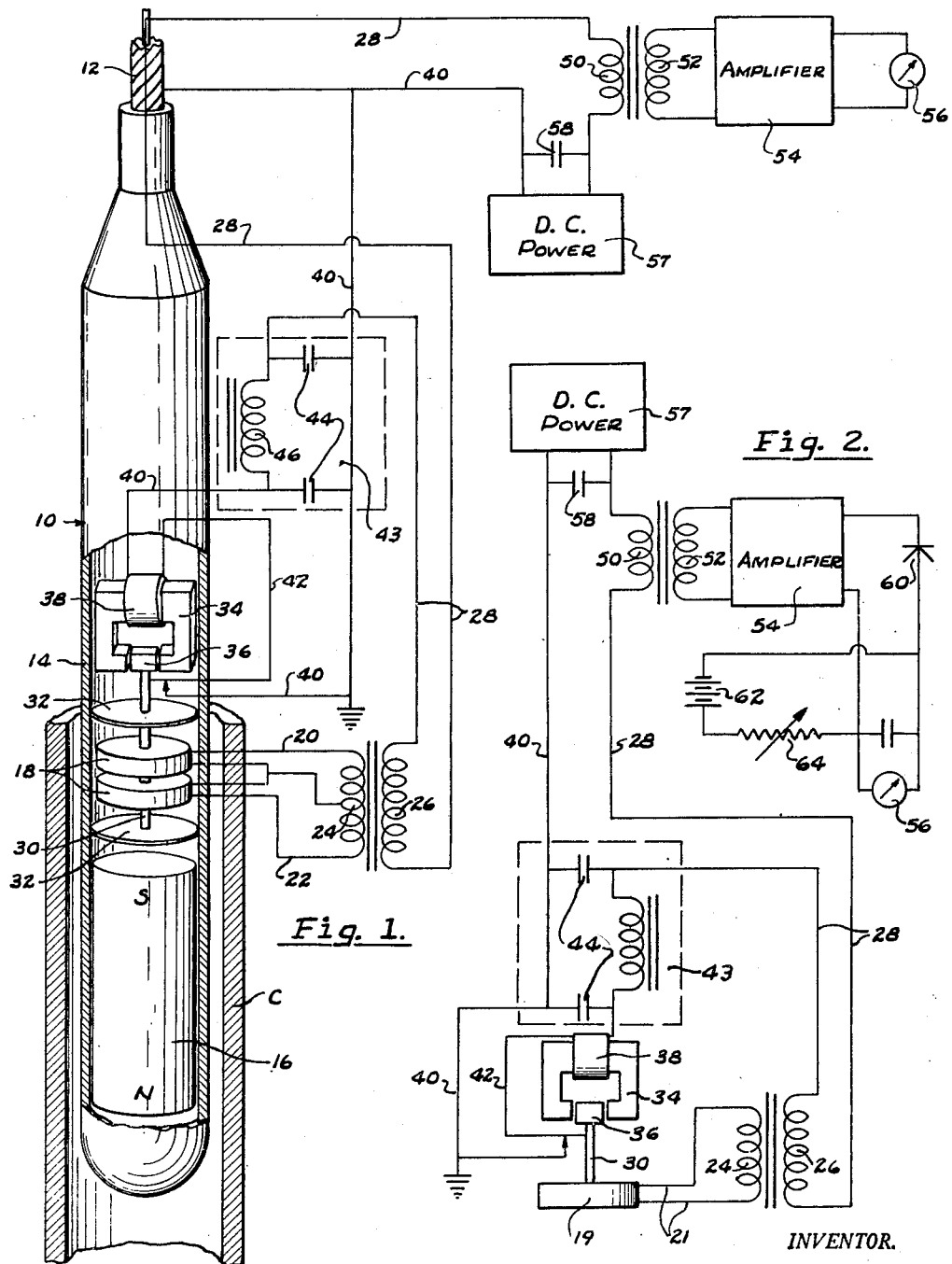

Nov. 19, 1957   J. C. BENDER   2,814,019
MAGNETIC METHOD OF DETECTING STRESS AND STRAIN IN FERROUS MATERIAL
Filed Oct. 3, 1951

INVENTOR.
JOHN C. BENDER
BY James F. Weiler

United States Patent Office 2,814,019
Patented Nov. 19, 1957

2,814,019

MAGNETIC METHOD OF DETECTING STRESS AND STRAIN IN FERROUS MATERIAL

John C. Bender, Bellaire, Tex., assignor to Houston Oil Field Material Company, Inc., Houston, Tex., a corporation of Delaware Application October 3, 1951, Serial No. 249,491

23 Claims. (Cl. 324—34)

This invention relates to magnetic methods of detecting stress and strain in ferrous materials and thereby determining physical properties of materials.

The present invention is particularly applicable to determine physical properties of pipe in or used in a well bore and the description, for the purpose of the disclosure, is given in connection therewith.

In the drilling of oil wells it frequently becomes desirable for a number of reasons to locate accurately certain conditions of the pipe and certain conditions in the well bore affecting the pipe positioned therein. For example, where drilling is by the rotary method, frequently the drill string or pipe becomes stuck or fixed in the well bore. Several and various causes contribute to this condition, such as caving, sedimentation, heaving and consequent packing of sand or earth formations about the pipe. It is, of course, highly desirable to determine as accurately as possible the exact point at which the pipe or casing is lodged or fixed in the well bore in order that the pipe may be retrieved in a most efficient manner and that a maximum amount of free pipe may be recovered on the first pipe retrieving run.

It is therefore a general object of the present invention to provide a magnetic method of testing drill stem or casing for or in deep wells.

A prime object of the present invention is the provision of a method of detecting irregularities in pipe or external forces affecting pipe by subjecting the pipe to magnetic flux and strain and detecting irregularities in such flux resulting from flaws in or external conditions affecting the pipe.

In one form the present invention comprises subjecting pipe or casing which is stressed or placed under strain to a magnetic flux and detecting irregularities in the magnetic flux to give an indication of the location, extent and character of flaws in the pipe or conditions affecting the pipe.

It is still a further object of the present invention to provide a magnetic method of detecting stress and strain in ferrous material by changing the magnetic field of the material through the application of stress and strain.

Other and further objects and features will be apparent from the following description taken in conjunction with the accompanying drawing, where like character references designate like parts throughout the several views, and where Fig. 1 illustrates suitable apparatus in elevation and partly in section for use in the present method, a suitable circuit being illustrated in connection therewith, and Fig. 2 illustrates a modified type of circuit which may be utilized in connection with the method of the present invention.

The present invention is based upon the discovery that a surprisingly strong signal is given by applying stress to ferrous materials which are subject to a magnetic flux, even though the magnetic flux may be relatively weak.

Referring now to the drawing, and particularly to Fig. 1, the testing device illustrated is generally indicated by the reference numeral 10 and is adapted to be lowered into a well bore by means of the wire line 12 to test the casing C.

A housing 14 is provided for the apparatus which houses a magnet 16 at its lower end. As indicated this magnet may be a permanent magnet, although any type of magnet may be employed for the purpose. Disposed above the magnet are a pair of vertically spaced coils 18 which are connected series opposed with a center tap by means of the conductors 20 and 22 to the primary 24 and thereby inductively coupled to the secondary 26 in the circuit indicated by the reference numeral 28.

The coils 18 are wound about suitable material, such as Bakelite, and are secured in vertically spaced relation to the rod 30 extending through the spacers or spiders 32 which in turn are fixed to the housing 14. Thus, the coils 18 are free to move axially of the casing or housing 14 to provide an axial sweep of the coils.

In order to actuate or vibrate the coils 18, a conventional push-pull system is provided which includes the electromagnet 34 and plunger head 36 positioned to work in the open end of the electromagnet. A coil 38 is wound about the electromagnet 14 and supplied with direct current by the conductors 40 and 42.

The push-pull arrangement illustrated is conventional and as the plunger head 36 is pulled upwardly into the magnet the circuit will be broken thereby permitting the plunger to fall by its own weight and thereby close the circuit and re-energize the magnet. Inasmuch as the plunger head 36 is secured to the upper end of the rod 30, this make and break system provides an axial sweep to the coils 18 which are secured to the plunger rod 30. While not illustrated, springs may be utilized to faciltate the downward movement of the plunger, and inasmuch as such make and break systems are conventional, no more description is deemed necessary.

Direct current is supplied to the push and pull assembly from a direct power source 57 and, as a refinement, a filter, generally indicated by the reference numeral 43 is provided to filter out the signal given by the push and pull assembly in order that the push and pull signal will not interfere with the signal obtained in testing. Manifestly, such a filter is not necessary, but obviously is desirable. As illustrated, the filter may comprise the pair of condensers 44 and the smoothing inductance 46 in the electrical conductor 40. Thus the push-pull signal is filtered out and the signal from the coils 18 is carried by the electrical conductors 28 up through the cable 12 to the primary 50 and the secondary 52, where the signal is amplified by the amplifier 54 and indicated in the indicating means 56. As illustrated, a condenser 58 is provided in the electrical conductor 40 to complete the alternating or frequency circuit.

The above apparatus is used in performing the method of the invention in the following manner, and, as an example, the method is used to test pipe in a well bore for flaws in or external conditions affecting the pipe.

The apparatus 10 is lowered by the cable 12 into a well bore having a casing or pipe C therein and as the device is lowered the permanent magnet 16 will subject the pipe to magnetic flux. During this time the pipe C is placed under strain by conventional well equipment means (not shown) and the make and break assembly provides an axial vibration or sweeping of the coils 18. Thus, the magnet 16 produces a magnetizing force upon the material of the surrounding pipe and retentivity of the pipe will cause a continuation of the magnetic flux or residual flux in the pipe, and such flux will exhibit irregularities in the forms of tufts of flux at the flaws in the walls of the pipe or where external conditions affect the pipe.

As the movement of the device is continued the inductors or coils 18 successively enter or leave these tufts of magnetic flux whereby an electromotive force is generated in the coils. The amplitude of this electromotive force is dependent upon various factors such as the rate of vibration or reciprocation of the coil assembly and the manner of connecting these coils and the intensity of the flux cut by the coils. Surprisingly, the intensity of the flux is increased by subjecting the pipe to strain. These factors are predetermined in the construction and operation of the device, and the method utilized, except that the magnetic flux intensity and pattern thereof is dependent upon the nature of the flaws in the pipe or the forces affecting the pipe as affected by applied stress. Thus the electromotive force induced in the secondary 26 and conducted through the conductors 28 and 40 provide the desired detection of flaws or external conditions in and affecting the pipe C.

As a further example, assume that the pipe is stuck in a well bore and it is desired to determine its point of fixation. The method is the same as described above except that free pipe above the place at which it is stuck is under strain and the pipe at its stuck point and therebelow is not under strain to the same degree as the pipe thereabove, thereby providing a good signal at the exact point at which the pipe is stuck.

A modification of the circuit is illustrated in Fig. 2 in which a single coil 19 is connected by means of the conductors 21 to the primary 24 instead of the pair of coils 18 connected in series opposed with a center tap. Other than this modification, the remainder of the circuit is the same as illustrated in Fig. 1 with the exception of the indicating means. Here the alternating current or frequency from the amplifier 54 is converted into a direct current by means of the rectifier 60. A direct current is provided from the battery 62 through the resistance 64 to balance the direct current from the rectifier or converter 60. Thus, the incoming signal and the direct current are balanced and upon obtaining a signal, such as the coils 19 passing a flaw in the pipe or a place where the pipe has external forces affecting it, an unbalancing of the currents will occur and an indication thereof is provided by the indicating means 56. Thus, the determination, location and extent of flaws or external conditions affecting the pipe is indicated and may be observed. Other than these modifications, the arrangement is identical with that of Fig. 1.

It is to be understood that any conventional apparatus may be utilized in the method of the invention and it is not necessary that residual magnetic flux be utilized. For example, apparatus disclosed and described in Patent No. 2,542,893, entitled Inspection of Ferro Magnetic Materials, issued February 20, 1951, and filed jointly with Bernard J. Kalb, may be utilized. Any of the embodiments illustrated and described in that patent may be utilized, and it will be noted that certain embodiments therein are provided in which the magnetic flux used is not a residual flux inasmuch as the inductors or coils are provided intermediate the poles of a magnet.

As indicated, the above described method is particularly adapted for determining the point of fixation of stuck pipe in a well bore and may be utilized to find flaws in the pipe such as splits, holes, threads in casing or pipe, inasmuch as there will be a change in the reflected load at that point which will be indicated by the testing circuit. Similarly, it is possible to locate accurately the position of gun perforation holes to determine whether or not the perforating has been performed at the desired location. In addition, the location of tool joints may be determined by reason of the change in the reflected load in the testing circuit and the location of the top of a liner, screen or a change in the size of the pipe may be readily indicated. Many times it is desirable to locate the top of a cement plug in casing and the present invention may be utilized to locate the top of the cement plug or, in the event gas is escaping about the pipe in a well bore, the escape of such gas will cause a temperature change in the pipe, thereby changing the reflected load of the pipe whereby the position or location of such escaping gas or fluid is readily indicated by the testing circuit. In addition, various valves, such as gas lift valves and metal adjacent the pipe, such as whip stocks and the like, may be readily indicated and the location determined by virtue of the change in the reflected load in the circuit.

While the above examples and the description has been directed toward the detection of flaws and physical conditions affecting pipe in a well bore, the invention is applicable to testing of materials other than that above described. For example, it is only necessary to provide means in which to place the material being tested under stress or strain, such as tension, compression or torque, or a combination of these forces, subject the material to be tested to a field of magnetic flux and observe the changes in magnetic flux.

It seems obvious that many changes may be made in the apparatus or circuit used in the method of the present invention and any conventional testing circuit or coils may be utilized. For example, any of the coils or arrangements illustrated in the patent to Knerr et al., No. 2,124,579, issued July 26, 1938, may be used.

Broadly, the present invention comprises applying a magnetic flux and stress or strain in ferrous metal whereby flaws in the metal or physical conditions affecting the metal may be observed and interpreted.

It is manifest that the invention is of wide scope and application and is not limited to the precise details given for the purpose of disclosure. Accordingly, the invention is limited only by the spirit thereof and the scope of the appended claims.

What is claimed is:

1. A method of determining physical conditions in magnetizable pipe in place in a well bore and conditions of the well bore affecting such pipe while in place comprising, stressing such pipe to produce strain therein, subjecting successive sections of such stressed pipe to the field of a permanent magnet, placing and maintaining within said field a test coil adjacent the surface of the pipe, subjecting successive portions of such stressed pipe to said field by moving said magnet along a length of said pipe, and instrumentally observing at the surface variations in the current from said test coil produced by variations in the leakage or projection of magnetic lines of force from said pipe during the movement of said magnet and test coil relative to said pipe.

2. A method of determining physical conditions in magnetizable pipe in place in a well bore and conditions of the well bore affecting such pipe while in place comprising, stressing such pipe to produce strain therein, providing a permanent magnet within said pipe, placing and maintaining within the field of said magnet a vibrating test coil adjacent the surface of the pipe, subjecting successive portions of such stressed pipe to said field by moving said magnet along a length of said pipe, and instrumentally observing at the surface variations in the current from said test coil produced by variations in the leakage or projection of magnetic lines of force from said pipe during the movement of said magnetic field and vibrating test coil relative to said pipe.

3. A method of determining physical conditions in magnetizable pipe in place in a well bore and conditions in the bore affecting such pipe while in place comprising, subjecting the pipe to a magnetic field, subjecting said pipe while in place to strain, and investigating the characteristics of the magnetic field in successive portions of the pipe while subjected to such magnetic field and to said strain whereby physical conditions in the pipe or conditions in the well bore affecting the pipe are indicated.

4. The method of claim 3 where the strain is applied to such pipe by lifting forces.

5. The method of claim 3 where the strain is applied to such pipe by torque forces.

6. The method of claim 3 where the strain is applied to such pipe by a combination of lifting and torque forces.

7. The method of claim 3 where the strain is applied to such pipe by compression forces.

8. The method of claim 3 where the strain is applied to such pipe by a combination of compression and torque forces.

9. The method of claim 3 where the strain is applied to such pipe intermittently.

10. A method of determining physical conditions in magnetizable pipe in place in a well bore and conditions in the well bore affecting such pipe while in place comprising, stressing said pipe while in place, successively subjecting portions of such stressed pipe to a magnetic field, investigating the characteristics of the magnetic field proximate such portions of such pipe while stressed and subject to such magnetic field, and instrumentally observing at the surface changes in the characteristics of the magnetic field.

11. The method of locating a stuck-point in a hollow magnetic member disposed in a borehole, which comprises linking a portion of a wall of said hollow member with a magnetic field, applying force to said member to cause a change in the magnetic characteristics of said member above the stuck-point, and measuring said magnetic field to determine whether magnetic changes occur in the linked portion of the hollow member affecting said magnetic field.

12. A method of determining physical conditions in magnetizable pipe in place in a well bore and conditions in the well bore affecting the pipe while in place therein comprising, stressing said pipe to produce strain therein, moving a magnetic field producing means in the pipe while stressed, maintaining a test coil in the magnetic field produced by said magnetic field producing means, and instrumentally observing variations in the current from the test coil produced by variations in the leakage or projection of magnetic lines of force from said pipe during the movement of said magnetic field producing means and the test coil relative to the pipe.

13. A method of determining physical conditions in magnetizable pipe in place in a well bore and conditions of the well bore affecting the pipe while in place therein comprising, stressing said pipe to produce strain therein, moving a magnetic field producing means in the pipe while stressed, maintaining a vibrating test coil within the magnetic field produced by said magnetic field producing means, and instrumentally observing variations in the current from said vibrating test coil produced by variations in the leakage or projection of magnetic lines of force from said pipe during the movement of said magnetic field producing means and said vibrating test coil relative to said pipe.

14. A method of determining physical conditions in magnetizable pipe in place in a well bore and conditions of the well bore affecting the pipe while in place therein comprising, moving a magnetic field producing means in said pipe, said magnetic field producing means including a test circuit and being responsive to said physical conditions in the pipe and said pipe as affected by said physical conditions in the well bore, applying force to the pipe to cause a physical change in the pipe, and instrumentally observing changes in the current in said test circuit caused by applying said force to said pipe.

15. The method of locating a stuck-point in a hollow magnetic member disposed in a borehole, which method comprises applying a force to said hollow member to stress the portion thereof above the stuck-point, and surveying the magnetic characteristics of said hollow member to determine the location of said stuck point.

16. The method of locating a stuck-point in a hollow magnetic member disposed in a borehole, which comprises applying a magnetizing force to an area of a wall of said hollow member, removing said magnetizing force, applying a mechanical force to said member to cause a change in the residual magnetic characteristics of said member above the stuck-point, and measuring the changes in the residual magnetism of said member during the application of said mechanical force.

17. The method of locating a stuck-point in a hollow magnetic member disposed in a borehole, which comprises magnetizing at least parts of said member, applying a force to said hollow member to stress the portion thereof above the stuck-point, and measuring changes in the residual magnetic characteristics of a previously magnetized portion of said member during the application of said force.

18. The method of locating a stuck-point in a hollow magnetic member disposed in a borehole, which method comprises applying a force to said hollow member to stress the portion thereof above the stuck-point, producing a magnetic field, progressively applying said magnetic field to the interior of said hollow member in linking relation to a wall thereof to produce an electrical characteristic quantitatively related to the magnetic characteristic of said member, and determining the location of said stuck-point by measuring the variation in said characteristics at said stuck-point caused by the magneto-strictive effect of said stress on said member.

19. The method of locating a stuck-point in a hollow magnetic member disposed in a borehole, which method comprises supporting within said member a magnetic element having a winding thereon, traversing said member with said element to cause the magnetic field of said element to link successive areas of a wall of said member, applying force to said member to cause a change in the magnetic characteristics of the portion of said member above the stuck-point, and measuring an electrical characteristic of said winding to determine when said element passes said stuck-point during traversal of said member.

20. The method of locating a stuck-point in a hollow magnetic member disposed in a borehole, which method comprises supporting within said member an inductive element, energizing said inductive element to produce a magnetic field, causing said element to traverse said hollow member thereby to link said field with successive areas of a wall of said member, applying force to said member to cause a change in the magnetic characteristics of the portion of said member above said stuck-point, and measuring the impedance of said element as it traverses said member to determine when said element passes said stuck-point.

21. The method of locating a stuck-point in a hollow magnetic member disposed in a borehole, which comprises applying a force to said hollow member to stress the portion of said member above the stuck-point and thus develop a magneto-strictive effect in the stressed portion of said member, and surveying the magnetic properties of said hollow member while stressed by said applied force, thereby to detect the demarkation between the portion of said member which is stressed by said applied force and the portion which is unstressed.

22. The method of locating a stuck-point in a hollow magnetic member disposed in a borehole, which comprises magnetizing at least parts of said member by applying a magnetizing force to an area of a wall of said hollow member, removing said magnetizing force, applying a mechanical force to said member to cause a change in the residual magnetic characteristics of said member above the stuck-point, and measuring the residual magnetism of said member during the application of said mechanical force.

23. The method of locating a stuck-point in a hollow magnetic member disposed in a borehole, which comprises residually magnetizing at least parts of said member by applying a magnetizing field thereto and then removing the magnetizing field therefrom, applying a stressing force to said hollow member to change the residual magnetic characteristics of the portion thereof above the stuck-point, and measuring the residual magnetic characteristics of said member.

References Cited in the file of this patent

UNITED STATES PATENTS

| | | |
|---|---|---|
| 890,085 | McCann et al. | June 9, 1908 |
| 1,666,680 | Buckley | Apr. 17, 1928 |
| 1,906,551 | De Forest | May 2, 1933 |
| 1,907,864 | Perry | May 9, 1933 |
| 2,365,073 | Haight | Dec. 12, 1944 |
| 2,370,845 | Davis | Mar. 6, 1945 |
| 2,435,985 | Stewart et al. | Feb. 17, 1948 |
| 2,530,309 | Martin | Nov. 14, 1950 |
| 2,542,893 | Bender et al. | Feb. 20, 1951 |
| 2,550,964 | Brookes | May 1, 1951 |
| 2,564,777 | Cavanagh | Aug. 21, 1951 |
| 2,582,437 | Jezewski et al. | Jan. 15, 1952 |

FOREIGN PATENTS

| | | |
|---|---|---|
| 433,620 | Great Britain | Aug. 14, 1935 |